Feb. 27, 1951 P. J. DEWYER 2,543,004
MACHINE FOR CUTTING SHORT LENGTHS OF TAPE FROM
A STRIP AND APPLYING THE SAME TO ARTICLES
Filed April 7, 1949 4 Sheets-Sheet 4
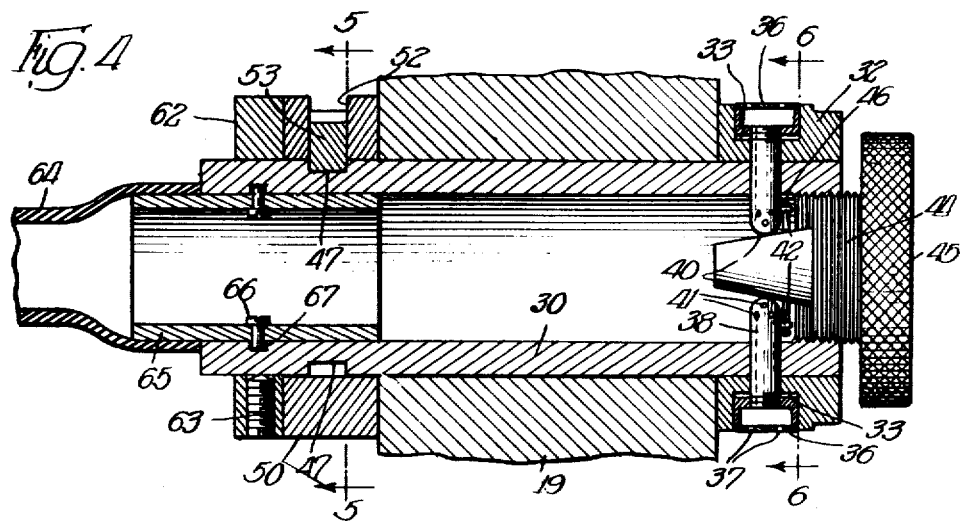
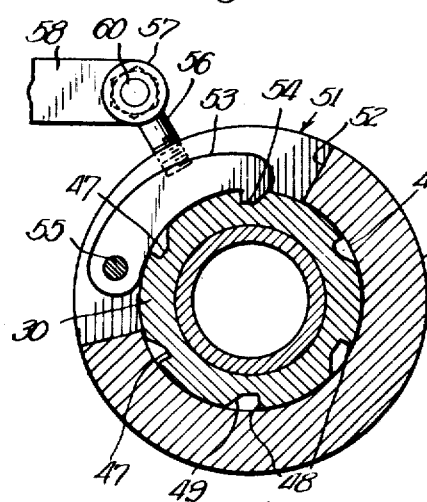
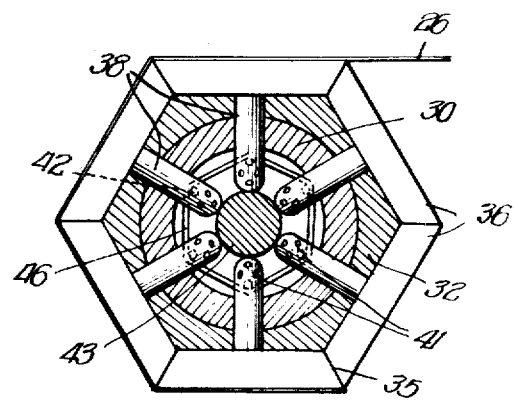
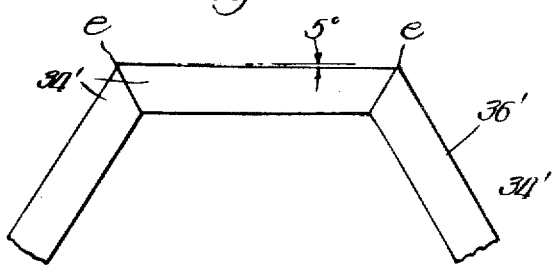
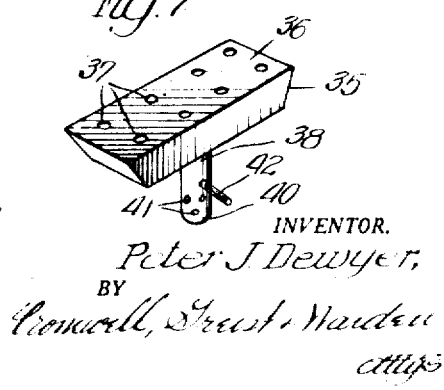
INVENTOR.
Peter J. Dewyer,
BY Patented Feb. 27, 1951

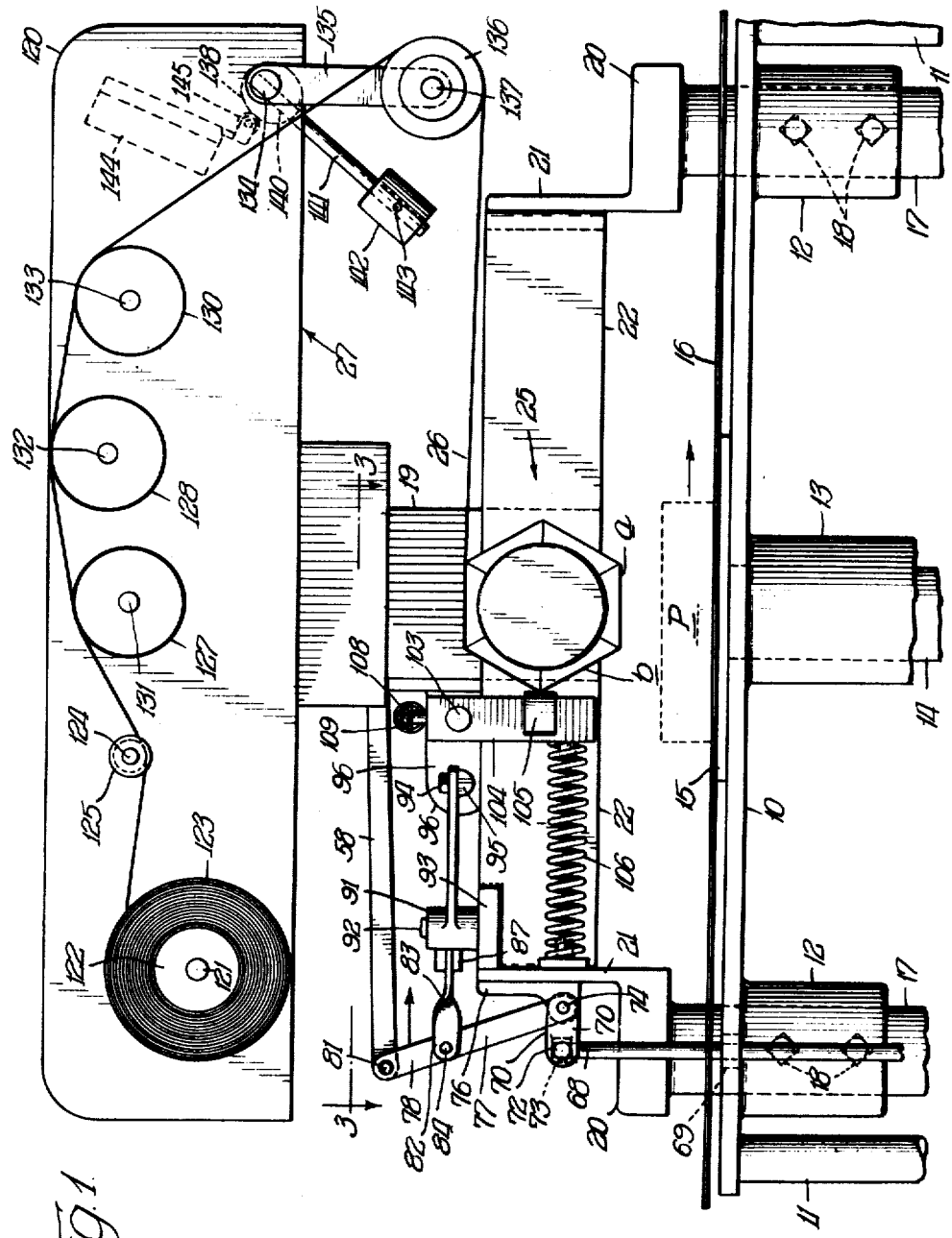

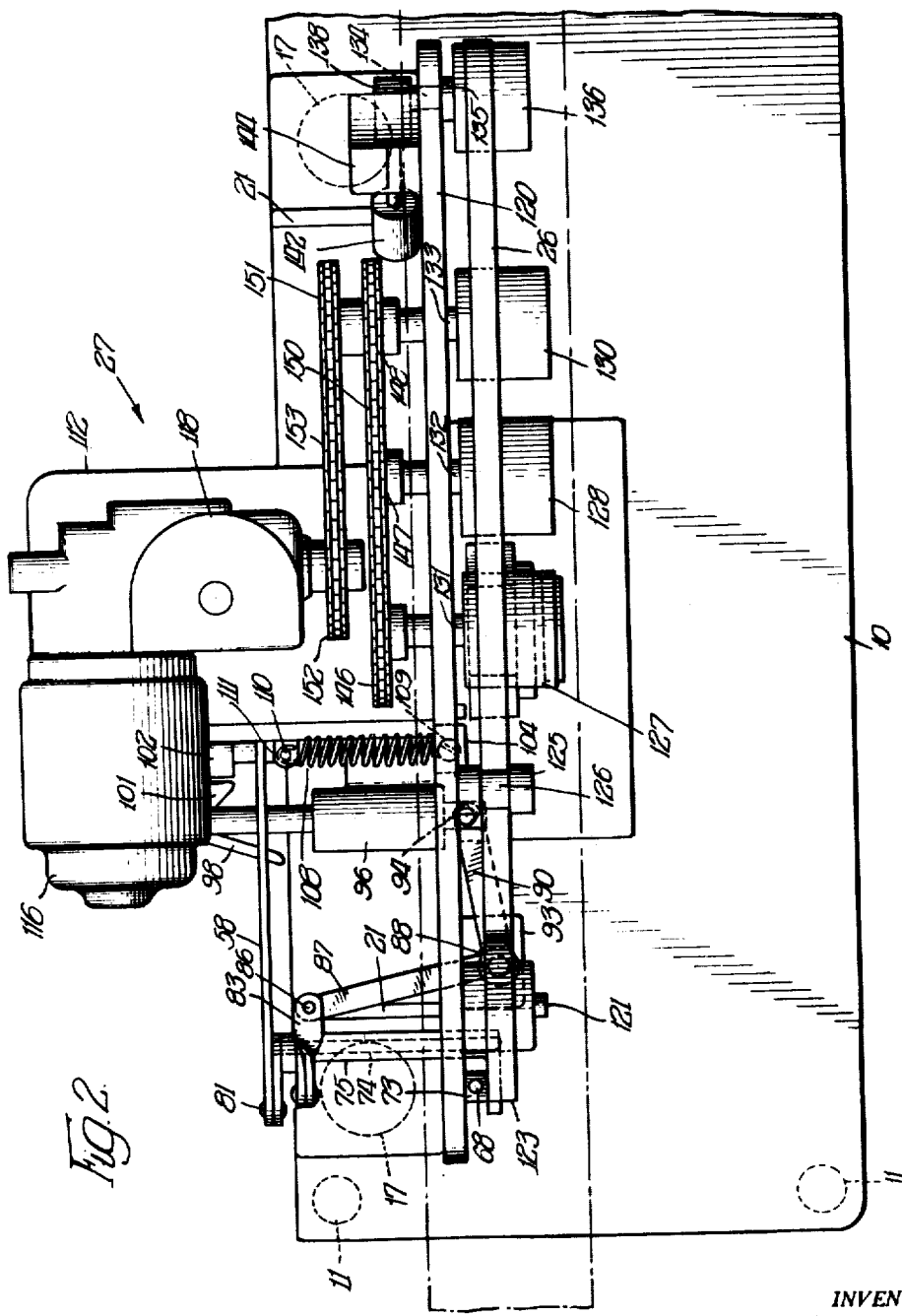

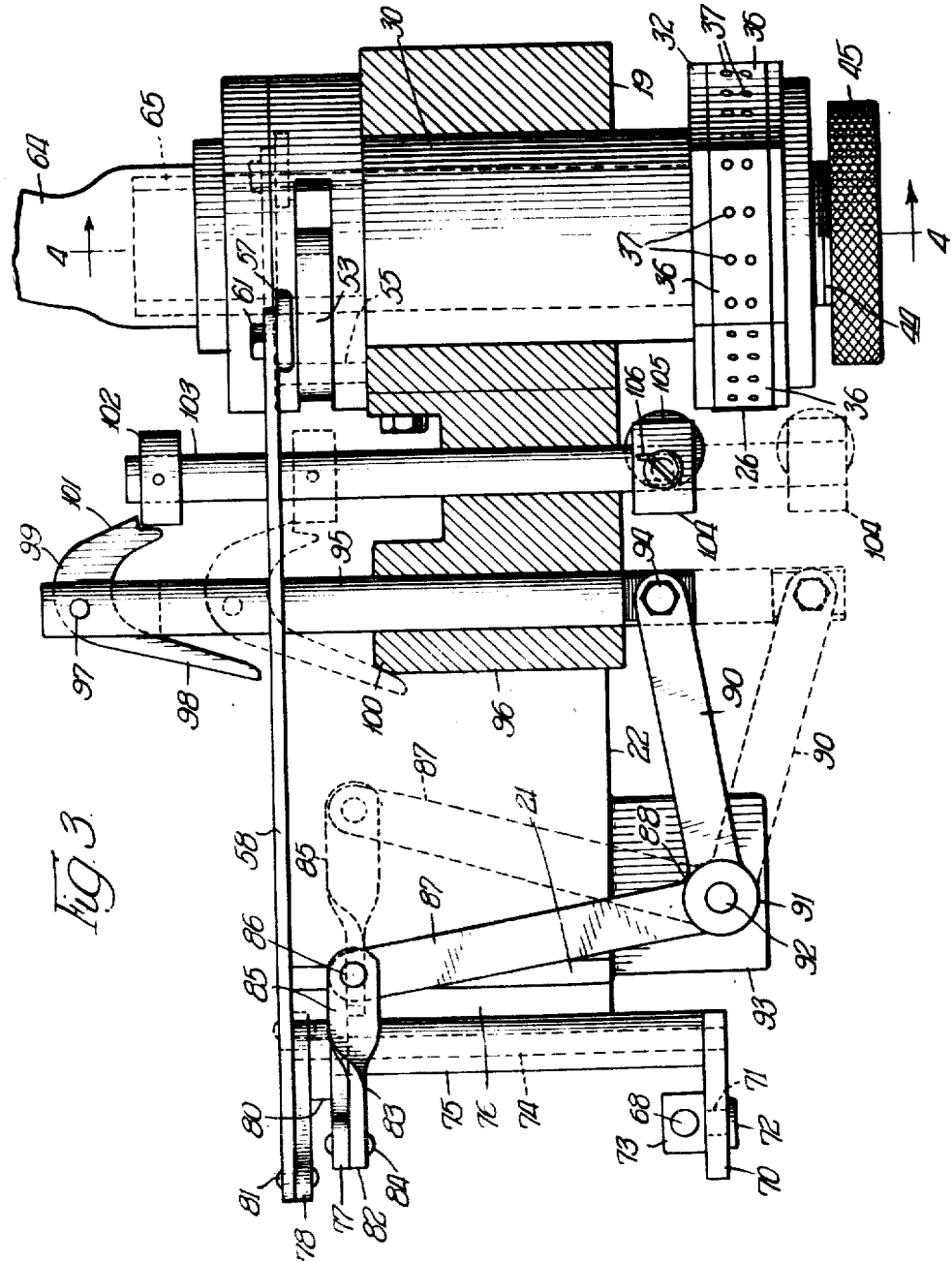

2,543,004

UNITED STATES PATENT OFFICE 2,543,004

MACHINE FOR CUTTING SHORT LENGTHS OF TAPE FROM A STRIP AND APPLYING THE SAME TO ARTICLES

Peter J. Dewyer, Libertyville, Ill.

Application April 7, 1949, Serial No. 86,060

17 Claims. (Cl. 216—21)

The present invention relates, generally, to a new and useful machine for cutting short lengths of tape from a strip and applying the same to articles. More particularly, the invention relates to a machine for automatically withdrawing tape from a supply roll thereof and dispensing it in short lengths that may be adhered to a series of articles conveyed through the machine. The invention is particularly useful in connection with pressure sensitive adhesive tape.

In the packaging field extensive use is being made of printed pressure sensitive adhesive tape. For example, such tape may be printed so that short lengths thereof constitute a label which may suitably be adhered to one of the surfaces of an article such as a package of merchandise. After being thus printed, the tape is normally rewound and supplied to the consumer in roll form.

There are many instances wherein several thousands of packages are to receive the printed labels provided by cutting the printed pressure sensitive adhesive tape into short lengths at the proper places to separate one label from the others. At the present time no suitable machine is available which can automatically unroll or unwind the roll of pressure sensitive adhesive tape and continuously cut it properly into the individual labels, and apply the same to the desired spot on an article or package. Power driven unwinding means are known and are in use for unwinding pressure sensitive adhesive tape from roll form but the tape so unwound has to be manually cut and applied to packages or other desired articles. It will be understood that there are many other instances wherein there is a requirement for a machine which will mechanically cut pressure sensitive adhesive tape, as well as other types of adhesive tape, into short lengths and hold them in such a manner that they may be conveniently applied to an article or package.

An important object of the present invention is the provision of a machine which will mechanically, and in a continuous manner, take the free end of a strip of adhesive tape, and more particularly, pressure sensitive adhesive tape, and continually cut it into short lengths of predetermined size and by suction hold each severed length in such manner that an article or package to which the same may be applied may be pressed thereagainst so as to receive the short length tape in the desired position.

Another important object of the present invention is the provision of an arrangement for automatically unwinding lengths of adhesive tape, particularly pressure sensitive adhesive tape, from a supply roll thereof so as to supply the same, as needed, under only a small amount of tension to a delivering device.

An important object of the invention is the provision of a rotatable tape holding device which upon being supplied with the uncoated side of the end of a length of adhesive tape will by suction hold the tape in place and crease it into short uniform lengths.

Still another object of the present invention is the provision of a rotatable holding device for receiving in a continuous manner the free end of a strip of adhesive tape with the adhesive coated surface exposed which comprises a plurality of perforated suction plates arranged as the sides of a regular polygon having an adjusting means for expanding and contracting the polygon while retaining it in regular form.

Another important object of the present invention is the provision of means for taking or receiving the free end of a strip of tape, particularly pressure sensitive adhesive tape, and continuously servering the tape into short lengths of uniform size, and continuously positioning the short lengths of tape with the adhesive coated side exposed so that the same may be pressed against the surface of an article or package thereby to be adhered thereto.

Yet another important object of the invention is the provision of an automatically operating machine which, upon being supplied with a roll of tape, particularly pressure sensitive adhesive tape, will automatically sever short lengths of uniform dimension from an unwound end thereof and apply the short lengths to the sides of articles or packages conveyed through the machine.

Still another important object of the invention is the provision of means for receiving the free end of a strip of tape, more particularly pressure sensitive adhesive tape, and continuously severing the tape into short lengths of uniform size, and continuously positioning the short lengths of tape in heated condition with the adhesive bearing side exposed so that the same may be adhered to a surface intended to receive the same.

Other objects of the invention will, in part, be obvious and will, in part, appear hereinafter.

For a more completed understanding of the nature and scope of the invention, reference may now be had to the following detailed description thereof taken in connection with the accompanying drawings, wherein:

Fig. 1 is an elevational view of a machine forming one embodiment of the present invention and which upon being loaded with a roll of adhesive tape operates to apply short lengths of the tape to a series of packages or articles conveyed therethrough;

Fig. 2 is a top plan view of the machine shown in Fig. 1;

Fig. 3 is an enlarged view, partly in section, of a portion of the machine and taken generally on line 3—3 of Fig. 1;

Fig. 4 is a longitudinal sectional view taken along line 4—4 of Fig. 3;

Fig. 5 is a sectional view taken along line 5—5 of Fig. 4;

Fig. 6 is a sectional view taken along line 6—6 of Fig. 4;

Fig. 7 is a perspective view of one of the suction applying segments forming an element of the rotatable tape holding device shown in Fig. 6; and Fig. 8 is a diagram showing a modification which may desirably be made in the suction applying segment or box shown in Fig. 7.

Referring now to Figs. 1 and 2 of the drawings, the reference character 10 designates a table suitably supported by means of a plurality of legs or posts 11. A pair of sleeves or collars 12 depend underneath the table 10 adjacent one side thereof and another collar or sleeve 13 is secured underneath the table 10, preferably, in a central location. The table 10 is provided with holes which register with the openings through the sleeves 12 and 13, respectively, and the sleeves 12 and 13 may suitably be secured in place as by welding.

The collar 13 serves as a guide sleeve for a post 14 which depends from the bottom of a small platform 15 over the center of which a flexible conveyor belt 16 may pass from one end of the machine to the other.

A pair of posts 17 fit within the collars 12 and may be adjustably positioned therein by means of the set screws 18—18. Integrally formed on top of each of the adjustable posts 17 is a rectangular head 20. A vertical plate or flange 21 is integrally formed on each of the heads 20 and lateral support plates 22 extend at right angles from each flange 21 and the adjacent side of a block 19 as shown in Fig. 1. The working elements which are supported on the cross beam 22 may, as a unit, adjustably be positioned to the desired level above the table 10 by setting the posts 17 as desired in the collars 12. As will appear hereinafter, this adjustment permits the machine to handle packages or articles of different sizes.

Midway between the vertical plates 21, and over the center of the raisable platform 15, a rotatable device is indicated, generally, at 25 for handling the free end of a strip of adhesive tape 26 which is applied thereto under little tension, as required, by a tape feeding device indicated generally at 27. The construction of the rotatable tape holder 25 is shown in detail in Figs. 3–7 and will be described in detail in connection therewith. A hollow shaft 30 is journaled by its middle portion in the bottom of the block 19. Over one of the projecting ends of the shaft 30 there is press fitted a hexagonal nut 32. In the side surface of the nut 32 and between the ends thereof, a circumferential channel of uniform depth is formed which is indicated at 33 in Fig. 4. A suction box or segment 34, as indicated generally in Fig. 7, sets in the channel 33 in each of the sides or faces of the nut 32. The thickness or depth of each of the box portions 35 is such that the perforated plates or covers 36 of the suction boxes 34 will be raised somewhat above the faces or sides of the nut 32 when the ends of the suction boxes 34 are brought together in the position shown in Fig. 6. The perforations 37 in the faces or plates 36 may be suitably arranged and have such such dimensions as will properly hold the uncoated side of the tape 26, as will be more fully explained hereinafter. A hollow stem 38 projects from the bottom or back side of each of the suction boxes 34 and the end thereof is rounded and closed as indicated at 40 (Fig. 7) and is provided with a plurality of lateral suction holes 41. A pin 42 projects from each side of each of the stems 38, as shown.

In the assembled condition, the stems 38 project through registering pairs of holes provided therefor in the hexagon nut 32 and the shaft 30 with the rounded ends of 40 thereof bearing on the side of an adjusting cone 43. The truncated conical member 43 is integrally formed on one side of a threaded plug 44 (Fig. 4) provided with a knurled thumb head 45 on the opposite side. The plug 44 is threaded into the end of the shaft 30 adjacent nut 32 and serves to plug off or close this end of the shaft.

In order to press the ends 40 against the adjusting cone 43, and also to retain the suction boxes 34 in the assembled position on the nut 32 and shaft 30, the clip or garter spring 46 fits over the projecting pins 42.

At the opposite end of the rotatable shaft 30 from that carrying the hexagonal nut 32, a pawl and ratchet mechanism for intermittently advancing or rotating the tape holder device 25 is provided as shown in Figs. 3, 4 and 5. Since it is desired to stepwise advance or rotate the tape holder device 25 a fraction of a revolution corresponding to the number of sides on the nut 32 (i. e. six), an equal number (i. e. six) of notches 47—47 (Figs. 4 and 5) are formed in circumferential alignment around the shaft 30. The leading end of each of the notches 47 is steep or vertical as indicated at 48 and the trailing end is slanted as indicated at 49. A two-part ring 50 fits over the shaft 30 so as to cover the band of notches 47 forming a ratchet. Section 51 of the ring 50 is cut out, as indicated at 52, Fig. 4, so as to receive a pawl 53, the hook end 54 of which has a shape corresponding to that of the notches 47, as shown in Fig. 5. The pawl 53 is pivotally mounted in the section 51 by a pin 55, as shown. A pin 56 having an eye 57 formed on the end thereof projects from the section 51 and serves as a pivotal connection between the ring 50 and one end of an operating link 58. It will be seen that a pin 60 extends through the eye 57 and the end of the link 58, the pin 60 being in the form of a stud bolt having a head 61 (Fig. 3).

The ring 50 is retained in its proper position on the shaft 30, after being placed thereon, by means of a retaining ring 62 (Fig. 4) provided with a set screw 63. The fit of the ring 50 is such that it turns easily on the shaft 30.

In order that suction may be applied to the suction boxes or fittings 34 carried in the faces of the hexagon nut 32, the end of the shaft 30 away from the end closed by the plug 44 is adapted to be connected with a suction hose 64 formed of flexible material such as reinforced rubber. It will be understood that the hose 64 may be connected with a suitable source of vacuum, such for example as a vacuum pump. The end of the hose 64 is expanded tightly over the projecting end of a nipple 65 which fits within the adjacent end of the shaft 30 and which is retained in place by a plurality of retaining screws 66, the ends of which extend into a circumferential slot 7 formed in the interior of the shaft 30, as shown. The fit between the nipple 65 and the shaft 30 has sufficient tolerance so as to allow the shaft 30 to rotate freely over the nipple 65 without appreciable loss in suction through leakage.

Operating mechanism is provided for rotating the tape holding device 25 and also for cutting the tape into short lengths corresponding to the lengths of the perforated suction plates 36 on each of the suction boxes 34. This operating mechanism is intermittently operated by means of power transmitted through a connecting rod 68 (Fig. 1) which extends through a slot 69 provided therefor in platform 10. At its upper end, the connecting rod 68 is pivotally connected to the outer end of a crank arm 70 by means of a pin 71 (Fig. 3) having a flange 72 formed on one side and a small block 73 formed on the opposite side and provided with a hole for receiving in the upper end of the rod 68. The crank arm or lever 70 is secured to one end of a rock shaft 74 which extends through a sleeve support 75. The sleeve 75 has an integrally formed flange portion 76 (Fig. 1) which is secured to the outer face of the adjacent vertical support plate 21, as shown. At the end of the rocker shaft 74 opposite that on which the crank arm 70 is carried, there is secured a crank arm 77 and a somewhat longer crank arm 78, these being separated from each other by a spacer 80. The crank arms 77 and 78 are secured on the shaft 74 in the same angular relationship with respect to the shorter crank arm 70.

The link 58 (previously referred to in connection with Fig. 5) is connected by means of a pin 81 to the outer end of the lever or arm 78 as shown in Fig. 3. In this manner turning movement of the arm 78 is transmitted through the link 58 to the ring 50 which carries the pawl 55 in segment 51 thereof.

The vertical end 82 of a link 83 is pivotally connected to the upper end of the lever or arm 77 by means of a pin 84 and the flat or horizontal end 85 of the link 83 is by means of a pin 86 connected to the end of one arm 87 of a bell crank 88, the other arm of which is designated at 90. The bell crank 88 is arranged to pivot in a horizontal line and at its elbow has a hub 91 which fits over a pin 92 extending vertically from a projection 93 which extends horizontally from the adjacent cross plate 22. The alternate operating position of the bell crank 88 is indicated in broken line in Fig. 3 and will be referred to hereinafter.

The outer end of the bell crank arm 90 is by means of a pin 94, which may be in the form of a stud bolt, pivotally connected with one end of a rod 95 slidably mounted and guided in a hole provided therefor in a bracket 96 which may be bolted to the adjacent side of the block 19. At its opposite end, the rod 95 is provided with a dog 99 pivotally connected therewith by a pin 97. The dog 99 has an extension 98 which in one position of operation rides against a cam surface 100 on the corner of the bracket 96, as shown in Fig. 3, so as to pivot the dog 99 and unlatch its notch end 101 from connection with a ring 102 secured to the adjacent end of a slide rod 103.

The rod 103 slides horizontally in a hole provided therefor in the bracket 96 and on the end thereof which is opposite that which carries the ring 102 a piece 104 (Figs. 1 and 3) is pivoted and extends downwardly adjacent the side of the hex nut 32 which carries the suction boxes 34.

A cutting roller 105 is rotatably carried on the element 104 with the horizontal center plane thereof aligned with the horizontal center plane of the hex nut 32. The roller 105 is mounted so that it rotates about its vertical axis. A compression spring 106, which is supported between the adjacent plate 21 and the element 104, serves to press the roller 105 into engagement with the corners formed between the suction boxes 34 when in indexed position, as shown in Fig. 1, when the roller 105 is opposite thereto.

In connection with the operation of the cutting roller 105, it will be noted that when the suction boxes or segments 34 are spread sufficiently, there will be some separation between the abutting ends thereof so that the roller 105 will ride against the double line corner of a slightly separated joint instead of against a single line corner or closed joint. Any cutting difficulty which may be encountered in this connection may be eliminated by modifying the structure as illustrated diagrammatically in Fig. 8. As there shown, the top perforated plates 36' of each of the segments 34' is pitched or slanted downward at a small angle (e. g. 5°) in a clockwise direction. In this way there will only be a single cutting line e edge at each corner of the polygon regardless of the amount to which the segments 34' may be spread. This slight pitch given to the plates 36' does not interfere with the normal operation of the tape holder or delivering device 25. In will also be understood that even though the suction boxes or segments 34' are modified as described, for practical purposes they form a regular polygon, i. e. hexagon, when assembled on the holder device 25.

The rod 103 is normally urged to its rearward position, as shown in full line in Fig. 3, by means of a coil spring 108 (Figs. 1 and 2), one end of which is secured to a pin 109 carried on the top of the member 104 and the other end of which is secured to a pin 110 (Fig. 2) projecting from an ear 111.

The operation of the portion of the tape dispensing machine so far described will be set forth below after the construction of the structure for supplying the tape holder 25 with tape has been set forth, in connection with Figs. 1 and 2.

The tape feeding structure 27 is supported above the block 19 by means of a platform 112 (Fig. 1) which supports an electric motor 116 and a gear reducer driven by said motor and indicated at 118. A vertical mounting plate 120 is mounted on one side of the platform 112, as shown.

The mounting plate 120 is provided with a number of openings through which project a plurality of stud shafts for supporting a number of elements comprising the tape feeding structure 27. Thus on a stud shaft 121 a spool 122 may be rotatably supported which carries a winding 123 of pressure sensitive adhesive tape. To the right of the spool 122 a shaft 124 is mounted in the support panel 120 and carries a tape guide roller 125 having a circumferential groove cut therein as indicated at 126 in Fig. 2. To the right of the guide roller 125 is a series of three rolls 127, 128 and 130 which are mounted on shafts 131, 132 and 133 respectively which extend through the panel 120. The surfaces of the rolls 127, 128 and 130 are mutilated in known manner so that the roll 127 presents the greatest amount of land surface, the intermediate roll 128 presents somewhat less land surface, and the roll 133 presents only very small amount of land surface. Such an arrangement is a known expedient for unwinding pressure sensitive adhesive tape from a roll thereof and feeding it off a roll from which it is easily lifted without tearing, i. e. the roll at 130.

A shaft 134 extends through the mounting panel 120 at the lower right-hand corner, and on the front end this shaft carries an arm 135 on the lower end of which is pivotally mounted a cork surfaced tension roller 136. A pin 137 secures the roller 136 to the lower end of the arm 135. On the end of the shaft 134 on the opposite side of the panel 120 from the arm 135 an eccentric cam 138 is secured having a hole 140 tapped therein for receiving the threaded end of a rod 141 on the end of which there is adjustably secured a weight 142. The set screw 143 serves as the adjusting means for securing the weight 142 in different positions along the rod 141, as desired. The weight 142 serves as a pendulum for applying the desired tension on the cork roller 136 as will be explained more fully hereinafter.

A switch 144 of known construction is mounted on the rear of said panel 120 so that the roller follower 145 thereof rides on the top of the eccentric 138 as shown in Fig. 1. The switch 144 is, in known manner, connected in series circuit relationship with the electric motor 116 so as to control the same. Both the motor 116 and the switch 144 are energized from a suitable source of electric current. When the pendulum 142 swings upwardly (i. e. clockwise) from the position shown, the high spot on the eccentric 138 is approached and the switch is tilted clockwise so as to close the circuit and energize the motor 116. Conversely, when the pendulum 142 falls, the low spot on the eccentric 138 is approached and the switch 144 is allowed to drop counterclockwise so as to open the circuit and de-energize the motor 116. The switch 144 may be any one of the several commercial forms available on the market.

On the ends of the shafts 131, 132 and 133, on the side of the panel 120 opposite that on which the rollers 127, 128 and 130 are carried, there are secured sprocket wheels 146, 147 and 148, respectively, over which runs a drive chain 150. Integrally carried with the sprocket wheel 148 on the same hub therewith is a second sprocket wheel 151 which is aligned with the power take-off sprocket 152 of the gear reducer 118. A drive chain 153 runs over the sprocket wheels 151 and 152 thereby driving the sprocket wheels 146, 147 and 148 in synchronism.

Although the apparatus is particularly useful in connection with the dispensing of pressure sensitive adhesive tape, it is also useful with other types of tape, such as tape having an adhesive coating which is normally dry but which may be moistened to the sticky condition by application of water. Accordingly, suitable water applicator means may be provided so as to moisten the tape, preferably after it passes the cutting roller 105. Such water applicator means may take the form of a sponge roll, a moistened brush, a spray, or other known forms of moistening.

If desired, I can use my tape dispensing apparatus to advantage in handling uncoated tape backing (i. e. backing with no adhesive coating).

In operation: A roll or spool of pressure sensitive adhesive tape 122 is placed over the shaft 121 and then the end of this is unwound sufficiently so that it may be threaded under the guide roller 125 over the roller 127, 128 and 130, down around the cork roller 136 and then the free end (uncoated surface down) is brought over the tape holder 25 and applied to at least two of the suction boxes 34.

Packages to be labeled are now passed through the machine on the conveyor 16. As soon as one of these packages comes over the platform 115, the conveyor 16 is stopped and the post 14 is raised thereby elevating the platform 15 and bringing the top surface of the package P up against the severed piece of tape a which is held by suction on the bottom suction box 34, as shown in Fig. 1. In this way, this piece of tape is picked up and secured to the package. The mechanism for raising the post 14 is not shown but it will be understood that it may be either manually operated, as by a foot pedal or hand lever, or it may be arranged to be mechanically raised by suitable mechanism of known design.

The mechanism that is used to operate the platform 15 is also desirably used to operate the connecting rod 68. When this is moved upwardly in its operation stroke, it transmits this movement to the links 58 and 83. The movement of te link 58 turns the pawl 53 one notch clockwise as shown in Fig. 5 so that the catch 54 engages the next trailing notch 47. At the same time, the movement of the link 83 to the broken line position as shown in Fig. 3 operates the bell crank 88 so as to actuate the rod 95 to its forward operating condition as shown in broken line in Fig. 3. As the rod 95 is thus actuated, the dog 99 engages the block 102 so as also to actuate the rod 103 thereby actuating the cutting roller 105 so that it is moved to the position shown in broken outline in Fig. 3. As the roller 105 rides across the corner or intersection of the perforated polygon opposed thereto and indexed as shown in Fig. 1, the pressure between the roller and the corner or intersection serves to sever the tape 26 across the width thereof.

As soon as the roller 105 passes the holder 25 and reaches its outermost position, the extension 98 on the dog 99 rides over the cam surface 100 on the bracket 96 and trips the dog 99 so as to allow the rod 103 to snap back to its rearward position under the influence of the spring 108. It will be understood that the tape holder 25 is retained motionless in its indexed position during the operation of the machine thus far described.

When the platform 15 is dropped back to the main table 10 and the connecting rod 68 is moved to its downward position, the arms 77 and 78 are returned to their alternate position thereby transmitting a reverse movement to the links 58 and 83. The reverse movement imparted to the link 58 rotates the pawl 53 backward to its alternate position thereby operating the ratchet mechanism so as to rotate the holder 25 one-sixth of a turn thereby bringing the severed piece of tape indicated at b in Fig. 1 so that it is downward and in a position for adhering to the next package to be brought up by the conveyor 16.

Rearward movement of the link 83 transmits its movement through the bell crank 88 so as to return the rod 95 to its rearward position and cause the dog 99 to again engage the rear side of the block 104.

It will be understood that the sequence of operation described above is repeated each time a package reaches the platform 15.

The tape feeding device 27 operates at all times to supply the tape holder 25 with tape. When pressure sensitive tape subject to stretching under tension is being handled, it is desirable that little or no tension be placed on the tape as it is supplied to the holder 25. By means of adjustment of the weight 142 on the rod 141, this tension can be adjusted, as desired. As the tape holder 25 rotates and withdraws tape from the cork roller 136, this roll swings to the left as viewed in Fig. 1 thereby raising the weight 142 and rotating the eccentric 138. After sufficient swing in this direction, the switch 144 will close and energize the motor 116 thereby driving the rollers 127, 128 and 130 so as to withdraw tape from the spool 122. The motor continues to run and the tape is fed off from the last roller 130 thereby allowing the tension roller 36 to swing back towards the right (counterclockwise) as viewed from Fig. 1, thereby taking up any slack in the supply. At the same time, the weight 142 falls and at the proper point the switch will be opened, thereby de-energizing the motor 116 and stopping the rollers 127, 128 and 130. In this way the tape holder 25 is at all times supplied with the required amount of tape which is under only the tension placed on it by the pendulum arrangement described.

This feeding arrangement shown and described is particularly useful in connection with pressure sensitive adhesive tape in which the backing is regenerated cellulose film. It is known that this type of tape stretches appreciably under tension, and since considerable tension is required to unwind it from roll form, considerable stretch is imparted to the tape by the unwinding rolls 127, 128 and 130. This tension on the tape 26 is relieved as the tape passes between the roll 130 and the rotatable holder 25 and over the cork roller 136, and the tape is allowed to resume its normal unstretched length before it reaches the tape holder 25.

When printed tape is being dispensed in the machine, the tape is initially placed on the holder 25 so that one of the printed labels is centered on the face 36 of each of the four suction boxes 34 that are covered. During operation there may be some tendency for the tape to shift position as the operation progresses. That is, the printed labels may tend to become uncentered with respect to the perforated faces 36, such uncentering taking place either in the rearward or forward direction. When the operator notes this condition, he proceeds to make a corrective adjustment therefor by turning the thumb screw 45 (Fig. 4) so as to move the adjusting cone 43 inwardly or outwardly as the correction requires. A slight amount of spreading of the suction boxes 34 will cause the tape to shift forward with respect to the movement of the perforated faces 36. Conversely, contraction of the suction boxes will result in the backward shift of the tape.

It will be apparent to those skilled in the art that a number of changes may be made in the design of the tape dispensing machine described above in connection with the accompanying drawings. For example, the pendulum arrangement used to take up slack and regulate the tension on the tape could be replaced with a flat spiral spring. Likewise, the tape dispenser 25 may be arranged to have a smaller or greater number of sides than six, for example, there may desirably be from five to eight sides.

It will be understood that when adhesive tape, other than the pressure sensitive type, is being handled, it may be unwound directly from a spool and passed onto the rotatable holder 25, thereby eliminating the unwinding mechanism 27.

Since certain further changes may be made in the foregoing construction, and different embodiments of the invention may be made without departing from the spirit and intent of the invention, all matter described above or shown in the accompanying drawings is intended to be interpreted as illustrative and not in a limiting sense.

I claim:
1. In a machine for continuously dispensing short lengths of tape from the end of a strip thereof, in combination: a rotatable tape holder comprising, a plurality of perforated plates arranged as the sides of a regular polygon with the opposite end edges of said plates abutting at the corners of said polygon, rotatable support means for said tape holder whereby the same is rotatable about its principal axis, and means for applying suction to said perforated plates, one end edge of at least one of said plates constituting a tape cutting edge; and, cutting means arranged to cut tape supported on said tape holder along said tape cutting edge.

2. In the combination called for in claim 1, one end edge of each of said plates constituting a tape cutting edge and indexing means operatively connected with said tape holder for stepwise advancing said tape holder to bring each of said tape cutting edges into position to be engaged by said cutting means.

3. A machine for dispensing short lengths of pressure sensitive adhesive tape, comprising, in combination: means for unwinding pressure sensitive adhesive tape from a supply roll thereof; a rotatable tape holder arranged to withdraw tape from said unwinding means and comprising, a plurality of perforated plates arranged as the sides of a regular polygon with the opposite end edges of said plates abutting at the corners of said polygon, rotatable support means for said tape holder whereby the same is rotatable about its principal axis, and means for applying suction to said perforated plates, one end edge of each of said plates constituting a tape cutting edge; and, cutting means arranged to cut tape supported on said tape holder along each of said tape cutting edges when said edges are successively advanced to occupy a fixed position wherein they may be engaged by said cutting means a line at least approximately coinciding with one of the lines forming the cylindrical surface generated by the corners of said polygon on rotation of said tape holder.

4. In the combination called for in claim 3, indexing means operatively connected with said tape holder for stepwise advancing each of said tape cutting edges to said fixed cutting position, the cutting element of said cutting means being in the form of a roller arranged to ride across each tape cutting edge when in said indexed cutting position.

5. A machine for dispensing short lengths of tape, comprising, in combination: means for unwinding tape from a supply roll thereof; a rotatable tape holder arranged to withdraw tape from said unwinding means and comprising, a plurality of perforated plates arranged as the sides of a regular polygon with the opposite end edges of said plates abutting at the corners of said polygon, rotatable support means for said tape holder whereby the same is rotatable about its principal axis, and means for applying suction to said perforated plates, one end edge of each of said plates constituting a tape cutting edge; cutting means arranged to cut tape supported on said tape holder along each of said tape cutting edges when said edges are successively advanced to occupy a fixed position wherein they may be engaged by said cutting means; driving means operatively interconnected with said tape unwinding means; and, control means associated with said driving means so as to supply said tape holder with its requirements for tape in an unstretched condition.

6. A machine for applying short lengths of tape to a series of articles conveyed therethrough, comprising, in combination: means for unwinding pressure sensitive adhesive tape as needed from a supply roll thereof; a rotatable tape holder arranged to withdraw tape from said unwinding means and comprising, a plurality of perforated plates arranged as the sides of a regular polygon with the opposite end edges of said plates abutting at the corners of said polygon, rotatable support means for said tape holder whereby the same is rotatable about its principal axis, and means for applying suction to said perforated plates, one end edge of each of said plates constituting a tape cutting edge; cutting means arranged to cut tape supported on said tape holder along each of said tape cutting edges when said edges are successively advanced to occupy a fixed position wherein they may be engaged by said cutting means; driving means operatively interconnected with said tape unwinding means; control means associated with said driving means so as to supply said tape holder with its requirements for tape; conveyor means extending past said tape holder and in proximity thereto; means for moving an article on said conveyor into engagement with said tape holder, operating means operatively interconnected with said tape holder, said cutting means and said article moving means, whereby when an article on said conveyor reaches a predetermined position opposite said tape holder said article is by relative movement therewith brought into flatwise contact with one of said perforated plates in a predetermined indexed position so as to pick up the short length of tape held by suction thereon and approximately simultaneously said cutting means is actuated, and thereafter said article is by relative movement therewith removed from said tape holder and said tape holder is rotated in the predetermined direction sufficiently to bring the next succeeding perforated plate into said predetermined indexed position.

7. A rotatable tape holder for advancing a free end of a length of adhesive coated tape without contacting the adhesive coated side, comprising, in combination, a hub structure, and a plurality of suction boxes having perforated faces mounted around said hub structure so as to form a regular polygon therearound having perforations therein.

8. The rotatable tape holder of claim 7 wherein there are six of said suction boxes and said polygon is a ragular hexagon.

9. A rotatable holder for advancing a free end of a length of adhesive coated tape without contacting the adhesive coated side, comprising, in combination, a hollow hub structure closed at one end and open at the other, and a plurality of suction boxes having flat perforated faces mounted around said hub structure so as to form a regular polygon therearound, each of said suction boxes having a suction stem projecting therefrom and extending through holes provided therefor in said hub so that the ends of said stems are located within the interior of said hub, the ends of said stems having openings therein so that suction applied to the interior of said hub will also be communicated to said suction boxes.

10. A rotatable holder for advancing a free end of a length of adhesive coated tape without contacting the adhesive coated side, comprising, in combination, a hollow hub structure closed at one end by a plug threadedly secured therein and having an inwardly extending coaxial projection having a conical surface, and a plurality of suction boxes having flat perforated faces mounted around said hub structure so as to form a regular polygon, each of said suction boxes having a perpendicular suction stem projecting from the inner side thereof and extending through holes provided therefor in said hub so that the ends of said stems are located within the interior of said hub, the ends of said stem having openings therein whereby suction applied to the interior of said hub will also be communicated to said suction boxes, and the ends of said stems bearing on the conical surface of said coaxial projection whereby said suction boxes may be forced outwardly an equal amount by turning said plug.

11. A machine for dispensing short lengths of pressure sensitive adhesive tape printed in repeated design, comprising, in combination: power driven means for unwinding said tape from a supply roll thereof comprising a plurality of tape withdrawing rolls arranged to receive the coated side of the tape and driven at equal peripheral speeds and having progressively less land surface in accordance with their relative removed relationship from said supply roll; a rotatable tape holder arranged to receive the end of the tape from said unwinding means on the uncoated side and comprising, a plurality of perforated plates arranged as the sides of a regular polygon, rotatable support means for said tape holder whereby the same is rotatable about the principal axis of said polygon, and means for applying suction to said perforated plates, one end edge of each of said plates constituting a tape cutting edge; cutting means arranged to cut tape supported on said tape holder along each of said tape cutting edges when said edges are successively advanced to occupy a fixed position wherein they may be engaged by said cutting means; indexing means operatively connected with said tape holder for stepwise advancing each of said tape cutting edges to said fixed cutting position and tape take-up means disposed between said unwinding means and said rotatable tape holder, comprising a roller disposed between and in alignment with said tape withdrawing roll most remote from said supply roll and said rotatable tape holder, said roller being carried on the free end of a pivoted arm whereby the roller is swingable in an arc toward and away from said tape holder, and biasing means connected with said pivoted arm so as to bias said roller away from said rotatable tape holder.

12. The machine called for in claim 11 wherein the biasing means for said roller is in the form of a pendulum connected with said pivoted arm in fixed angular relationship therewith.

13. The machine called for in claim 11 wherein said tape unwinding means is driven by an electric motor operatively connected in driving relationship therewith, said motor being connected in circuit control relationship with a tiltable switch connected with said pivoted arm so as to open when said roller reaches the inner end of its arcuate swing and so as to close when said roller reaches the outer end of its arcuate swing.

14. A rotatable holder for advancing a free end of a length of adhesive coated tape without contacting the adhesive coated side, comprising, a regular prism having a hollow hub, suction passageways communicating between said hollow hub and openings in the lateral faces of said prism whereby when suction is applied to said openings through said passageways tape will be held flatwise onto said faces.

15. In a machine for continuously dispensing short lengths of tape from the end of a strip thereof, in combination: a rotatable tape holder comprising, a regular prism having a hollow hub, suction passageways communicating between said hollow hub and openings in the lateral faces of said prism whereby when suction is applied to said openings through said passageways tape will be held flatwise onto said faces, rotatable support means for said tape holder whereby the same is rotatable about its principal axis, and means connected with said hub for applying suction to said face openings, the lateral edges of said prism constituting tape cutting edges; and tape cutting means arranged to cut tape supported on said tape holder along each of said lateral edges of said prism as each lateral edge is advanced into position to be engaged by said cutting means.

16. A rotatable holder for advancing a free end of a length of adhesive coated tape without contacting the adhesive coated side, comprising, a multi-sided rotatable body having a hollow hub and a plurality of lateral tape supporting sides regularly arranged therearound, each of said tape supporting sides of said body being parallel to the axis of rotation of said body and the corner edges formed by the intersection of said sides providing tape cutting edges, suction passageways communicating between said hollow hub and openings in the lateral sides of said multi-sided body whereby, when suction is applied to said openings through said passageways, tape will be held flatwise onto said sides.

17. In a machine for continuously dispensing short lengths of tape from the end of a strip thereof, in combination: a rotatable tape holder comprising, a multi-sided rotatable body having a hollow hub and a plurality of lateral tape supporting sides regularly arranged therearound, each of said tape supporting sides of said body being parallel to the axis of rotation of said body and the corner edges formed by the intersection of said sides providing tape cutting edges, suction passageways communicating between said hollow hub and openings in the lateral sides of said multi-sided body whereby, when suction is applied to said openings through said passageways, tape will be held flatwise onto said sides, rotatable support means for said tape holder whereby the same is rotatable about its principal axis, means connected with said hub for applying suction to said side openings, and tape cutting means arranged to cut tape supported on said tape holder along each of said corners as each corner is advanced into position to be engaged by said cutting means.

PETER J. DEWYER.

REFERENCES CITED

The following references are of record in the file of this patent:

UNITED STATES PATENTS

| Number | Name | Date |
| --- | --- | --- |
| 2,238,436 | Von Hofe | Apr. 15, 1941 |
| 2,363,277 | Anderson | Nov. 21, 1944 |